UNITED STATES PATENT OFFICE.

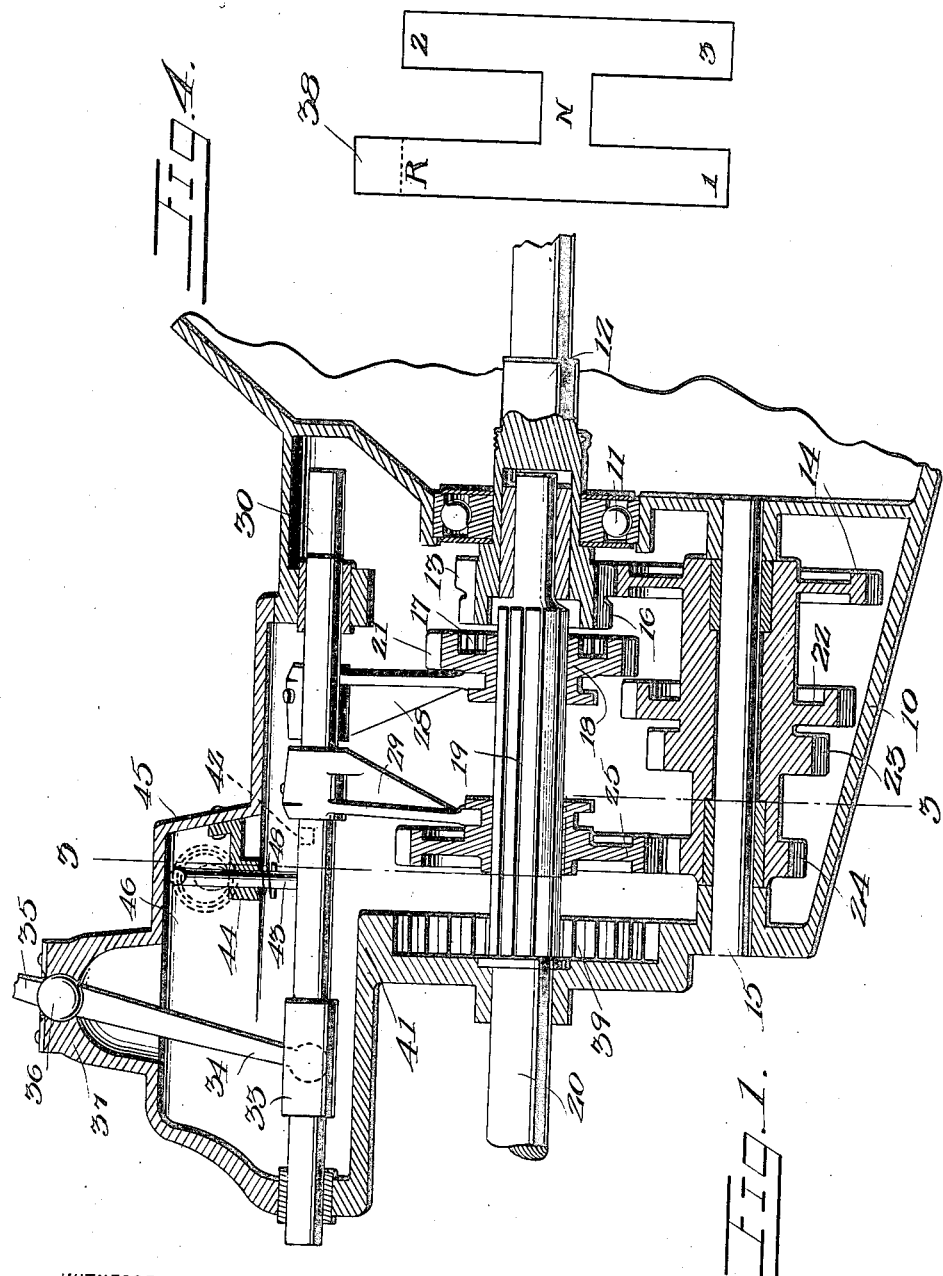

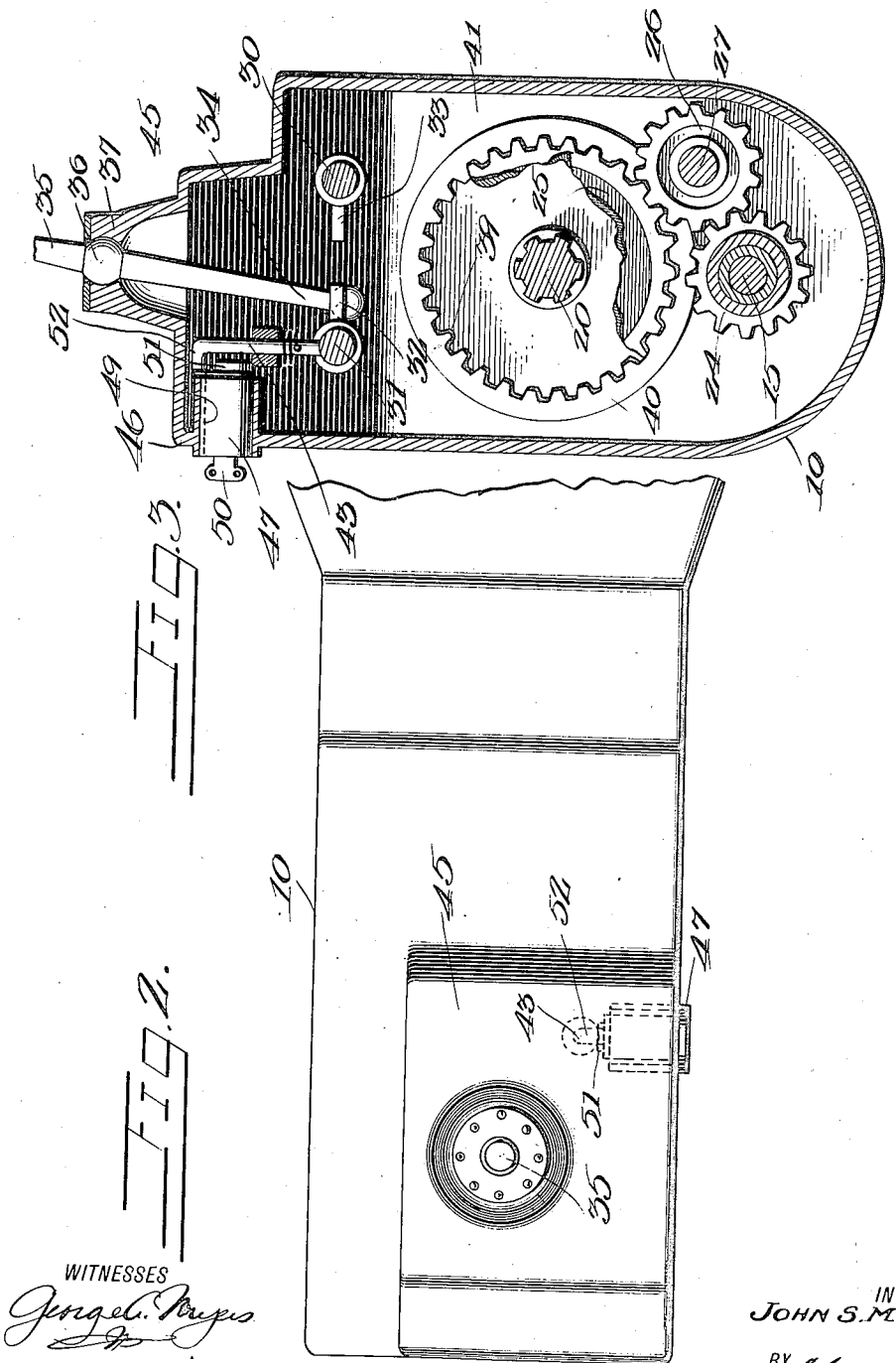

JOHN SMITH MICHAEL, OF ABERDEEN, MARYLAND.

TRANSMISSION-LOCK FOR AUTOMOBILES.

1,368,822.		Specification of Letters Patent.		Patented Feb. 15, 1921.

Application filed April 26, 1920. Serial No. 376,720.

*To all whom it may concern:*

Be it known that I, JOHN SMITH MICHAEL, a citizen of the United States, and a resident of Aberdeen, in the county of Harford and State of Maryland, have invented certain new and useful Improvements in Transmission-Locks for Automobiles, of which the following is a specification.

My present invention relates generally to vehicle locking devices and more particularly to transmission locks, my object being the provision of a simple convenient and efficient mechanism which will involve minimum change in and addition to the conventional automobile transmission and which will automatically act by a simple movement of the gear shift lever beyond one of its normal limits of movement in such a way as to lock the propeller shaft so as to prevent towing of the vehicle and at the same time permit the engine to be started and freely operate without danger of clashing or stripping of gears.

With these general objects in view my invention resides in the mechanism to be now described with respect to the accompanying drawings, forming a part of this specification, and wherein, Figure 1 is a vertical longitudinal section through a transmission case and its gearing, provided with my improvements, Fig. 2 is a top plan view thereof, Fig. 3 is a vertical transverse section taken on line 3—3 of Fig. 1, and Fig. 4 is a diagram showing the conventional path of movement of the gear shift lever and the slight change contemplated by the application of my invention thereto.

Referring now to these figures and particularly to Fig. 1 I have shown a transmission case at 10, through a bearing 11 in the front wall of which the rear axially bored end of the crank shaft 12 extends and is provided with a gear 13 permanently in engagement with a larger gear 14 on the transmission shaft 15 journaled in the case 10. The crank shaft 12 also has a gear 16 engageable with the internally toothed portion 17 of a gear member 18 which is splined upon the portion 19 of the propeller shaft 20 extending into the transmission case and which when in engagement with the gear 16, constitutes the high gear position. The gear member 18 has an externally toothed portion 21 movable to engage a transmission shaft gear 22 rigid with the gear 14 and which latter position places the parts in the intermediate or second speed. The transmission shaft has gears 23 and 24, the former of which is engageable by a gear 25 splined on the rear portion 19 of the propeller shaft at the rear of the gear member 18 to place the parts in the low or first speed position. Gear 24 engages a gear 26 which as seen in Fig. 3 is mounted upon a counter shaft 27, and the gear 25 is shiftable to engage gear 26, upon which the direction of rotation through the transmission is reversed.

The two shiftable gear members 18 and 25 are moved by shifter yokes 28 and 29 respectively secured upon upper parallel and lengthwise movable shifter rods 30 and 31, the former of which thus controls the second and third or intermediate and high speeds and the latter of which thus controls the first or low speed and reverse.

The shifter rods 30 and 31 mounted to slide in bearings in the upper portion of the transmission case 10, have inwardly projecting and opposing lever engaging members 32 and 33 into which the lower end 34 of the gear shift lever 35 is movable. This gear shift lever has a ball joint 36 in the upper ball joint extension 37 of the gear case and is thus movable in the usual H-shaped path as indicated in the diagram of Fig. 4 and through the connecting leg of which the lever is shiftable from one rod to the other, being in neutral position at that time with the gear members 18 and 25 released.

As the parts are shown in Fig. 1 the gear is set for reverse, gear member 25 being in engagement with the reversing gear 26, and the gear shift lever 35 being in the position indicated by the letter R in Fig. 4, constituting one of its normal limits. My invention contemplates a further movement of the gear shift lever in the same direction beyond the letter R as indicated by the extension 38 of the H path of movement so that gear member 25 may be shifted rearwardly beyond the reversing gear 26 and out of engagement with the latter and at the same time into engagement with the internal teeth 39 of a stationary ring 40 formed upon the inner face of the rear wall 41 of the transmission case concentric with the propeller shaft 20.

My invention also contemplates and proposes a notch or recess 42 in the shifter rod 31 which comes into position below the lower end of a vertically shiftable locking pin 43 when the gear member 25 is shifted into engagement with the toothed stationary ring 40. This position finds the propeller shaft 20 locked against rotation so that the rear wheels of the vehicle will thus be prevented from turning and the vehicle cannot be towed, although the gears of the counter shaft 15 are freely revoluble and thus the engine can be started and the crank shaft 12 can freely rotate without danger of clashing or stripping of gears.

The locking pin 43 has vertical movement in a bearing bracket 44 carried by the upwardly enlarged upper portion 45 of the cover of the transmission case, which upper portion 45 has one of its side walls 46 apertured to receive a lock generally indicated at 47 in Fig. 3. The locking pin 43 is engaged by a spring 48 which tends to thrust the same in a downward direction so that its lower end will be moved into the notch or recess 42 of the shifter rod 31 when the latter comes beneath the locking pin in the position of the parts above described, so as to thus lock the shifter rod and consequently the gear shifting parts.

The lock 47 includes a key controlled rotating barrel indicated by the dotted lines in Fig. 3 and movable upon the introduction of a proper key 50, the inner end of this lock barrel having a cam extension 51 beneath the upper angular end 52 of the locking pin 43 and which in normal position is at the lowest point of its travel as seen in dotted lines in Fig. 1 so as to enable the locking pin to move downwardly, the lower end of this locking pin normally resting upon the surface of the shifter rod 31.

When however upon the stopping of the vehicle the operator desires to lock the same, the gear shift lever 35 is moved toward reverse position and then beyond reverse position so that the gear member 25 engages the stationary ring and the locking pin 43 drops into the shifter rod recess as previously described, the upper angular end 52 of the locking pin moving downwardly against the upper surface of the cam projection 51 of the lock. The transmission and the vehicle are locked for the reasons previously specified and remain locked until the operator inserts the proper key 50 in the lock permitting the barrel to be rotated by the key for a half turn, during which the cam projection 51 elevates the locking pin 43 to released position against the tension of its spring 48. Immediately after this has taken place the operator grasps the gear shift lever 35 and moves the same inwardly to any of the proper gear positions or neutral position and after the shifter rod 31 has thus been shifted to move its notch or recess 42 out of registry with the locking pin 43, the key controlled barrel 49 of the lock is given another half turn to the normal position so as to again position the parts as in Fig. 1 ready for subsequent automatic locking action when the gear shift lever is thrust into its extended locking position previously described.

It is obvious from the foregoing that for the purposes of my invention minimum change is made in the conventional transmission and minimum addition is necessary thereto and that such additions and changes as are required are of a simple, compact and convenient nature which will be durable in use, subject to little if any wear and capable of maintaining permanent readiness for automatic operation without interfering with the normal action of the gear shifting parts.

I claim:

1. The combination with the shifter rods, one of which has a recess, movable speed changing gears controlled by movement of the rods, and the case in which the rods and gears are movable, of a stationary toothed locking member in the case and into engagement with which one of said gears is shiftable, a spring controlled locking pin normally in movable engagement with the said recessed shifter rod and arranged to enter the recess thereof when said movable gear engages the said toothed locking member, and key controlled means for shifting the locking pin out of the said recess and arranged to normally permit operative movement of the locking pin under pressure of its spring.

2. The combination with the shifter rods, one of which has a recess, movable speed changing gears controlled by movement of the rods, and the case in which the rods and gears are movable, having an upper extension, of a stationary toothed locking member in the case and into engagement with which one of the said gears is shiftable, a spring controlled locking pin having bearing in the upper extension of the case and vertically movable with its lower end normally resting on the recessed shifter rod, said pin being positioned to move into the said recess when the said movable gear engages the toothed locking member and having an actuating spring and an upper angular end, and a key controlled rotatable member also in the upper extension of the case, having an inner cam normally spaced beneath the said angular end of the locking pin and rotatable to engage and lift the pin out of the recess.

JOHN SMITH MICHAEL.